United States Patent [19]

Schaeffer

[11] Patent Number: 5,339,249

[45] Date of Patent: Aug. 16, 1994

[54] MACHINE CONTROL SYSTEM

[75] Inventor: William R. Schaeffer, Monticello, Ind.

[73] Assignee: Parker Hannifin Corporation, Cleveland, Ohio

[21] Appl. No.: 784,279

[22] Filed: Oct. 29, 1991

[51] Int. Cl.⁵ .............................................. G06F 15/20
[52] U.S. Cl. ........................... 364/474.18; 364/474.15; 364/551.01
[58] Field of Search ...................... 364/474.04, 474.11, 364/474.15, 474.16, 474.17, 474.18, 474.37, 551.01, 551.02, 182; 318/637, 638, 572, 592

[56] References Cited

U.S. PATENT DOCUMENTS

| | | | |
|---|---|---|---|
| 3,946,212 | 3/1976 | Nakao et al. | 364/552 |
| 4,370,721 | 1/1983 | Berenberg et al. | 364/474.35 X |
| 4,636,960 | 1/1987 | McMurtry | 364/474.35 |
| 4,719,586 | 1/1988 | Moyer et al. | 364/571.02 X |
| 4,725,705 | 2/1988 | Holland-Moritz et al. | 364/474.04 X |
| 4,835,897 | 8/1989 | Shinskey | 364/554 X |
| 4,945,501 | 7/1990 | Bell et al. | 364/474.35 X |
| 4,974,165 | 11/1990 | Locke et al. | 364/474.18 X |

Primary Examiner—Jerry Smith
Assistant Examiner—Brian C. Oakes
Attorney, Agent, or Firm—Ralph E. Jocke

[57] ABSTRACT

A feedback apparatus used in combination with a programmable machine controller for a multi-spindle screw machine wherein each spindle has a corresponding machine tool mounted on a moveable servo slide. The feedback apparatus includes at least one measurement device that produces an electrical output indicative of a dimensional characteristic of each work piece. The measurement device data is inputted to a data analyzer that calculates average values and range for a predetermined subgroup number of work pieces. The analyzer provides this data electronically to a programmable offset device that determines new offset values for the machine tool slides to maintain the subgroup average values and range within predetermined limits. The feedback apparatus provides "on the fly" offset updates to the machine controller to compensate for average machine process performance as well as individual machine tool and spindle performance.

6 Claims, 3 Drawing Sheets

MACHINE CONTROL SYSTEM

BACKGROUND OF THE INVENTION

The present invention relates generally to control devices for automated machinery. More particularly, the present invention relates to programmable machine controllers that can change operating parameters of a machine by offsetting positions of the machine tools.

The use of programmable controllers with automated numerically controlled machines is well known. Typically, machines such as screw machines that are used to work, shape and finish metal bar stock to a desired end product include a plurality of spindles that hold the raw bar stock. The spindles are mounted on a revolving carrier. Each spindle can rotate at high speed and is indexed to various positions by rotational movement of the carrier. One or more machine tools are positioned proximate the spindles so that as a spindle is moved next to the tool the cutting or finishing process is carried out. Each tool typically is used for a single type of operation, such as forming a particular size outside diameter, inside diameter, or various cutting operations such as forming threads. Each machine tool is mounted on a tool slide that can be moved by an electric motor to a desired position.

A programmable controller coordinates all of the above functions so as to have the numerically controlled machine operate in an automated manner. The controller has a memory section in which is stored the dimensional characteristics of the parts to be made. The operator enters the part identification to the controller, usually through a keyboard interface device. The controller then causes the tool slide to move to a predetermined position to form the desired feature of the part. The tool slide can be actuated in a conventional manner such as with a servo feedback motor control in response to an electrical signal generated by the machine controller.

In today's competitive manufacturing environment it is not uncommon that part tolerances be maintained to within ±0.001 inch or less from nominal. Automated machinery is well suited for this work because the machine controller can locate the machine tool with a high degree of precision. However, dimensional variations from piece part to piece part are an inevitable result of any machined part. The objectives then are to detect such variations, including any trends of the machine that may eventually result in out-of-tolerance parts, and to compensate the machine tool for such potential errors before they occur.

A known technique for maintaining control over a manufacturing process is statistical process control or SPC. The basic concept of SPC is fairly simple. Measure the process performance, determine any trends that may eventually result in unacceptable output, and adjust the process according to the current data. By way of example, assume that there is a need to control a machine process that forms an inside diameter (ID) for a cylinder. Under SPC, each piece part (or a statistically significant sample) that has been through the process is measured for ID size according to the drawing (specified) requirement. As more and more parts come off the machine, arithmetic averages of the IDs can be calculated. In addition, for a predetermined sample size, the maximum and minimum ID values can be determined, thus yielding the overall range of ID sizes the machine is currently producing. By continually updating these statistical calculations, a real-time analysis is made of the machine process performance versus the specification requirement per the drawing. If the average values are drifting from nominal it indicates that over time the machine may not be able to hold the needed tolerance. Adjustments for this drift can then be made in the machine to return the process back toward nominal. Further, if the range begins to widen it indicates that the machine's repeatability is not only suspect, but that any drift in the average values may result in out-of-tolerance parts.

The statistical data provided by SPC analysis yields useful information on the machine performance. For example, SPC analysis shows that machines require a certain run-in time after start-up before they are performing in an optimum manner, so that the initial parts made after a cold start (such as might occur after a machine is idle overnight) may well be unacceptably close to the tolerance limits even though a pre-run check might indicate the machine is functioning correctly. If the measured range of parts is too wide during this time, or if the range gets worse or the average values does not improve, out-of-tolerance parts will eventually result.

While the use of SPC analysis is fairly common these days, the technique still relies heavily on operator or engineer interpretation and utilization. In other words, SPC analysis provides data that can indicate trends but that data must be correctly interpreted. More difficult, though, is the fact that once the data has been interpreted, someone must then decide how to adjust the machine to correct the trend.

With programmable machine controllers, an operator can usually enter an offset value into the controller to adjust the programmed tool slide position. The operator, however, must estimate the amount of offset needed to correct the trend shown by the SPC data. Thus, the practical application of SPC is an open loop function that heavily relies on both human interpretation of SPC data and estimation of the needed corrective measures. The operator typically estimates the amount of offset needed either based on experience or based on the data from a single piece part. In either situation, the value of the SPC analysis is greatly diminished because of not only the possibility of different operators reaching different interpretations and conclusions, but also the problem that basing estimates on single part dimensions negates the data based on averages and range. Another significant disadvantage is that the operator must temporarily shutdown the machine to enter the new offsets.

The need, therefore, exists for a system in which SPC analysis can be incorporated into a machine control system so as to provide a real time closed-loop control that detects machine performance trends and automatically compensates for the same.

SUMMARY OF THE INVENTION

The present invention provides a closed loop feedback control for a numerically controlled machine having a programmable machine controller. The invention contemplates a feedback arrangement that is based on real-time statistical performance data measured from parts produced by the machine. According to this aspect of the invention, real-time performance data is analyzed and used to automatically update machine tool offsets to compensate for performance trends detected by the statistical analysis.

The invention further contemplates a control system in which the machine tool offsets are based on average values and range for predetermined sets of machined parts. According to this aspect of the invention, proper analysis of the average value and range results in a predictive trend analysis that permits correction of a machine's performance before parts are produced that would otherwise be out of tolerance.

The present invention contemplates a feedback control scheme that automatically calculates the appropriate offset adjustments according to predetermined formulas using the real-time statistical data and analysis. This results in a true closed loop control system that utilizes real-time performance data without depending on operator interpretation and interface. In accordance with this aspect of the invention, offset adjustments can be made "on-the-fly" during normal machine operation thus minimizing machine downtime and shortening the time period for correcting undesirable trends or conditions.

These and other aspects and advantages of the present invention will be apparent to those skilled in the art as fully set forth and explained in the detailed description of the preferred embodiment hereinbelow in view of the accompanying drawings.

DESCRIPTION OF PREFERRED EMBODIMENTS

Figure 1:
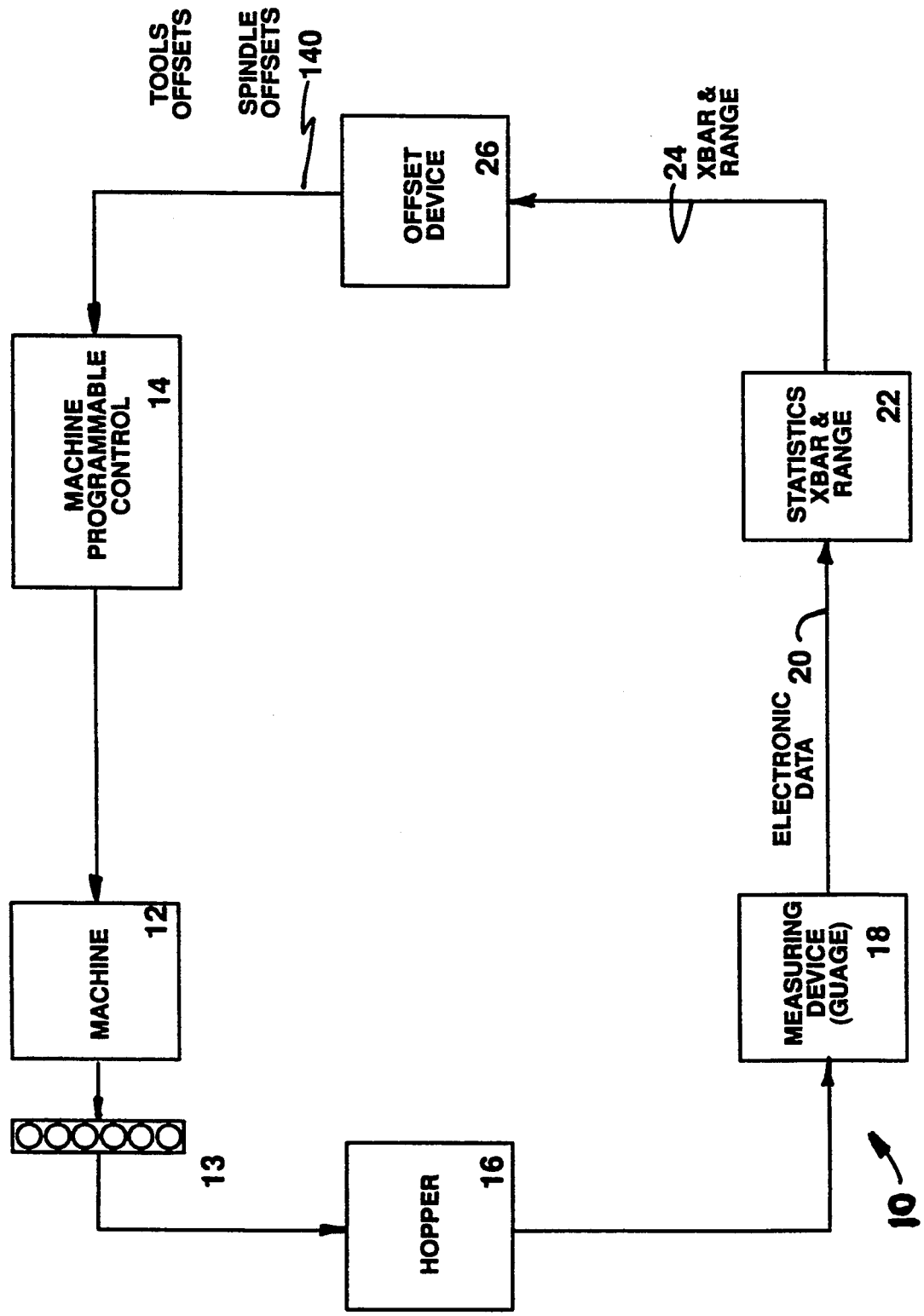
FIG. 1 is a simplified block diagram of a closed loop feedback control system according to the present invention for an automated machine.

A feedback apparatus in accordance with the present invention is illustrated in FIG. 1 and generally indicated by the numeral 10. The invention is particularly well suited for use in combination with a multi-spindle machine 12 and programmable machine controller 14. For purposes of explanation only, the invention will be described herein with reference to a specific type of machine and controller, however, those skilled in the art will appreciate that the invention can readily be used with any number of similar numerically or computer controlled machining systems.

In the illustrated case, the machine is a multi-spindle automatic bar machine such as Model 2⅜ RB6 manufactured by National Acme Company of Cleveland, Ohio. The design and operation of such machines is well known to those skilled in the art and is readily available from various user manuals and instructions available from the manufacturer. The details of the machine design and operation are not illustrated in the drawings as they are well known and readily available. Briefly, a plurality of spindles 13 (shown schematically only) are mounted in a circular pattern on a rotatable carrier. Each spindle includes a chuck mechanism for holding one end of a bar stock, which end is the current work piece during the machining operation. The carrier is rotated in a discreet indexing fashion such that each partial rotation of the carrier aligns each spindle adjacent a corresponding machine tool. The spindles rotate at high speed so that the machine tool achieves the desired cutting or forming operation. For example, one machine tool may form an inner diameter, another may form an outer diameter, another may cut screw threads, and yet another may serve to cutoff the work piece after it has been indexed through all the other machine tool operations. The particular machine tools used, of course, will be determined by the particular type of part that is being machined.

In addition, each machine tool is mounted on a moveable slide. The machine tool must be moveable, of course, in order to be able to effect the desired machining or cutting operation. In the example used herein the machine tools are mounted on conventional servo slides which are controlled by electric motors.

The automatic machine 12 is operated under the control of the programmable machine controller 14. A particular controller suitable for use with the present invention is a Series 6 programmable logic controller manufactured by General Electric Company of Bloomington, Ill. The controller 14 is essentially a computer that is programmed to direct the various functions of the screw machine 12 such as rotation of the spindles, indexing movement of the carrier, and positioning the machine tools by operating the servo slide electric drive motors. Again, design and operation of the machine controller 14 is well known and available from the manufacturer. It is important to note, however, that the particular machine controller selected (such as the example given) should preferably have the capability of being electronically updated with new machine tool offset data and executing such offset instructions on the fly during normal continuous machine 12 operation.

The controller 14 is programmed using appropriate software to control the movement of each machine tool in the correct manner and sequence, to achieve the desired machining operation. A particular advantage, of course, of such automated machining operations is that all dimensions and characteristics of the various parts to be machined can be converted to machine tool position data and stored in the controller 14 memory. All the operator needs to do is type in the part number or identifier to the controller and all machining steps will automatically be carried out without further input from the operator.

As each finished work piece is cut off from its corresponding bar stock, it typically drops into a temporary storage hopper 16. The operator may then transfer the finished pieces to another storage area, or may first select a sample of parts for testing.

The finished parts are removed from the hopper 16 for testing any number of specific machined characteristics. For purposes of explanation it will be assumed that the operator needs to monitor how well the machine 12 is forming and controlling the outer diameter of a part. This example is intended only to assist in the further explanation and understanding of the invention, and not in any limiting sense. Those skilled in the art will appreciate and understand that any and every feature of the parts that is characteristic of one or more of the machine 12 functions can be used with the present invention.

The operator will select an appropriate tool, gauge or other measuring device 18 and measure the selected work piece dimension. For example, an electronic gauge particularly useful for measuring outside diameter is Model DEI-51111-D manufactured by Federal Products Corp. of Providence, R.I. This device converts the physical dimension (outside diameter) into an electrical output signal. Many types of gauges are available to provide electronic data representations of physical properties or dimensions; and the design of these devices in and of themselves form no part of the present invention. Alternatively, standard gauges can be used and the operator can then input the data to the next stage through an electronic keypad or similar device. This approach is not as desireable since it requires additional operator interface whereas direct data conversion from the gauge to the next stage is substantially more accurate and efficient.

The electronic data is input to a data collector and statistical analyzer 22 via a cable link 20. A particular analyzer 22 that has been used successfully with this invention is the DataMyte 862 Data Collector manufactured by DataMyte Corporation of Minnetonka, Minn. The analyzer 22 receives the electronic data from the gauge 18 and after a predetermined number of samples have been tested, calculates the average value and range for the set or subgroup of test samples. The range is defined as the difference between the highest and lowest readings for each subgroup. For example, if there are six spindles in the machine 12, a subgroup may be defined as the six work pieces machined during a single complete rotation of the carrier. Thus it would be known that every sixth sample was from the same spindle. A mechanism (not shown) may be provided, such as the use of proximity detectors, to provide an indication to the operator which spindle each test piece came from.

The statistical data and individual subgroup sample readings are electronically output from the data collector 22 and sent over a cable 24 to a programmable offset device 26. Preferably, the offset device 26 is a logic controller that is programmed to receive the data collector output, compare the data to a predetermined set of conditions, determine the new offsets required for the machine 12, and electronically update those offset values in the programmable machine controller 14. A logic device that has been found particularly well suited with the present invention is the Model 545 Logic Controller manufactured by Texas Instruments, Inc. of Dallas, Tex.

Detailed information on creating software programs for the logic controller 26 is readily available from the manufacturer. The electronic data from the offset device 26 may be input to the machine controller 14 in a manner similar to an electronic update from a keyboard interface. An advantage of the invention, of course, is that these offset values can be updated immediately in a real-time fashion without requiring any operator decision, analysis, input, or interruption of machine 12.

Figure 2:
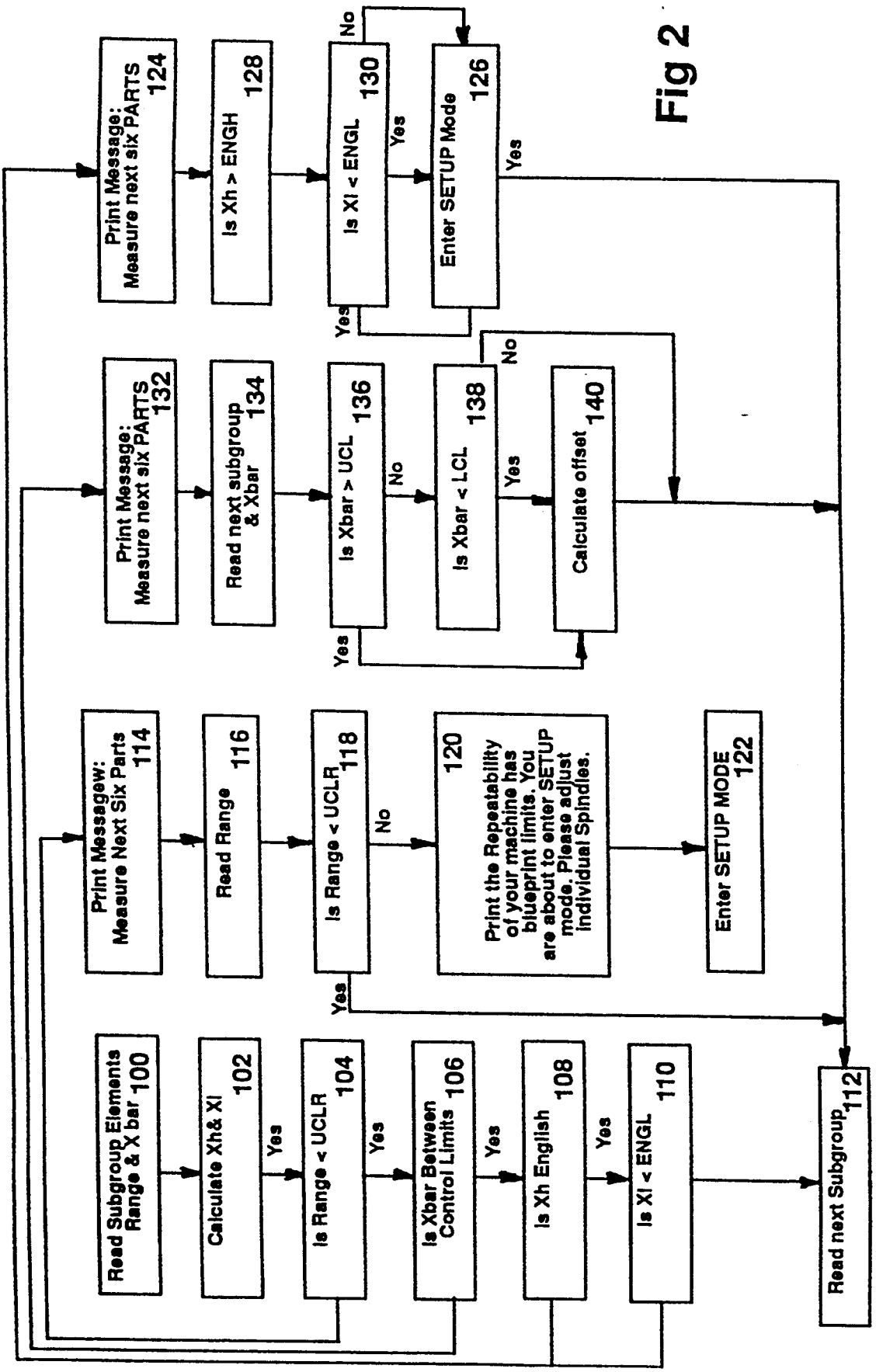
FIG. 2 is a software flow diagram for a computer program that executes the identified instructions for controlling the feedback control system represented in FIG. 1.

FIG. 2 outlines a flow chart for a software program that executes and controls the feedback system according to the present invention. At step 100 the individual subgroup readings for each work piece or element, along with the subgroup average and range are read into memory from the analyzer 22. At step 102 the highest and lowest readings ($X_h$, $X_L$) in the subgroup are determined and in step 104 the subgroup range is compared to a predetermined maximum value ("UCLR"). If the range is within the acceptable limit, the program proceeds to step 106 and compares the average value of the subgroup readings to a predetermined set of control limits. Preferably, the control limits are made tighter in tolerance than the drawing specification for the part. For example, if the nominal outer diameter specification is 2 inches±0.010 inches, the control limit for the average value might be set at 2 inches ±0.005 inches. By setting the control limits tighter than the drawing tolerance, and by an appropriate limit in the range value, a designer can be assured that no out of tolerance (per the drawing) part will be machined.

If the criteria of steps 104 and 106 pass, the program checks at steps 108 and 110 that the highest and lowest readings (i.e., the pair of readings that define the range, $X_h$ and $X_L$) of the subgroup are within the drawing requirement ("ENGH" and "ENGL"). If they are, then all the parts must be within tolerance, and the data on the next subgroup is collected at step 112.

If the criteria at step 104 fails, it indicates that the subgroup range is unacceptably wide. This condition could result in out of tolerance parts unless the machine performance is compensated. The program branches to a range verification subroutine and at step 114 the operator is instructed to measure the next subgroup of parts from the machine 12. The data collector 22 determines the range for this range verification subgroup and inputs the information to the offset device 26. At steps 116 and 118 the program reads the range value and again compares it to the maximum allowed value, UCLR. If the range of this subgroup is within limits, the program returns to the main routine at step 112 and continues to monitor the next subgroup tested.

If the second subgroup fails at step 118, it is a strong indication that repeatability of the machine is suspect. At step 120 a message is printed or displayed to the operator that the machine must go through a setup or calibration routine (step 122) prior to continuing production, as will be further explained.

The setup mode is also entered if the criteria of steps 108 or 110 are not met. In this case, the program branches to a subroutine at step 124. The operator is instructed to measure the next subgroup of parts from the machine 12. If any of the parts exhibit an out of specification reading, setup mode is entered at step 126. If all the parts pass at steps 128 and 130, the program returns to the main routine at step 112.

As previously stated, even if the subgroup range passes the criteria at step 104, the subgroup average value must pass a tolerance requirement at step 106 that preferably is tighter than the drawing specification. If the subgroup average is outside the predetermined control 1 limits, the program branches to an offset subroutine at step 132. First, the operator measures a new subgroup of parts. The data collector 22 calculates the average value for this subgroup and this data is read at step 133. At steps 134 and 136 the program determines if the average is between the predetermined upper and lower control limits ("UCL", "LCL"). If the subgroup average passes, no offset adjustment is made and the program returns to the main routine at step 112.

If the subgroup average is still outside the control limits at step 134 or 136, the offset device calculates the new machine tool offset values at step 138. These new offset values are inputted to the machine controller 14 via cable link 140. The controller 14 updates all the corresponding tool slide positions and thereby compensates all spindles for the detected trend.

The new offset value is calculated to be the difference from nominal of the mean value of the two subgroup average readings determined at steps 100 and 133. In equation form the new offset is defined as:

$$\text{New Offset} = \text{Nominal} - \frac{(\text{Subgroup Avg. 1} + \text{Subgroup Avg. 2})}{2}$$

when the subgroup averages exceed the upper control limit (i.e., the subgroup average value is too high; and $$\text{New Offset} = \frac{(\text{Subgroup Avg. 1} + \text{Subgroup Avg. 2})}{2} - \text{Nominal}$$

when the subgroup average is less than the lower control limit (i.e., the subgroup average is too low) where in both equations, nominal is the target value per the drawing requirement for the part.

Using subgroup average values to adjust the machine 12 offsets is an important improvement over the prior art. Previously, offsets would be merely best guess estimates by the operator based on each operator's experience and interpretation of the statistical data from the data collector 22. In accordance with the invention, however, the offset control is now closed loop with the offsets being predetermined according to a specific set of criteria, with an automatic update of those offsets to the machine controller 14. Thus, trends in the machine 12 producing to high a range or average value can be immediately compensated on-the-fly. Furthermore, in the prior art the operator based the new offset value only on the measurements from a single work piece. According to the invention, offsets are adjusted based on subgroup average values which provide a much more accurate trend prediction than individual work piece data.

Figure 3:
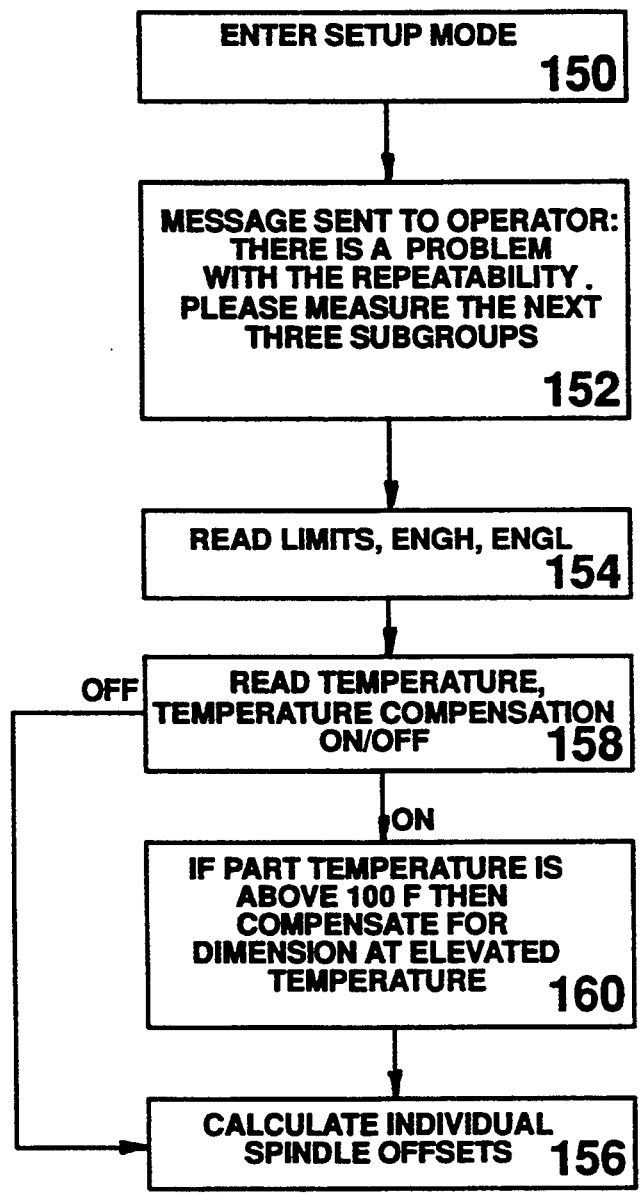
FIG. 3 is a software flow diagram for a setup configuration program that can be used with the feedback control system represented in FIG. 1.

As explained above, if the criteria at step 118 or 128 or 130 is not met, the program branches to the setup subroutine at step 150 (see FIG. 3). In the setup mode, the operator is instructed at step 152 to measure several subgroups of parts. For example, the operator may be instructed to measure three subgroups. On a six spindle machine this would mean the operator will measure 18 parts, three from each spindle. This data is received by the data collector 22 and inputted to the offset device 26. At step 154 the offset device 26 reads the specification limits from the controller 14 for the part being machined (ENGH, ENGL). The mean value of these two numbers is, of course, the nominal or target value for the machining process.

The offset device 26 receives the eighteen data values for the three subgroups. Thus, the device 26 has three data readings for each spindle and calculates the average value for each spindle. At step 156 the program calculates the new offset for each spindle as being the difference from nominal of the corresponding spindle average. The updated individual offsets are then inputted to the controller 14 on cable 140 which offsets each tool slide to bring the individual spindle back to nominal performance. At steps 158 and 160 the offset can further be compensated according to the machine temperature as inputted for example, from a thermocouple.

Thus, in the setup mode, each spindle offset is recalculated based on its average performance from nominal, whereas in the offset subroutines of steps 132-138, the same offset adjustment affects all six spindles equally. Thus, the offset update at step 138 will compensate primarily for subgroup average trends (all six spindles averaged together), but the offset update at step 156 will bring each spindle back to nominal performance thus eliminating out of tolerance parts (detected at steps 128 or 130) or tightening the range (detected at step 118) by improving the repeatability of each spindle.

The present invention thus provides a closed loop feedback apparatus that on a real-time basis can detect trends in machine performance using SPC statistical data analysis and compensate for those trends during normal machine operation. Operator interpretation of data and offset calculation is obviated by the programmed analysis done by the offset device 26. The offset adjustments are also based on average trends so as to substantially improve the predictive capability of the system.

While the invention has been shown and described with respect to a particular embodiment thereof, this is for the purpose of illustration rather than limitation, and other variations and modifications of the specific embodiments herein shown and described will be apparent to those skilled in the art within the intended spirit and scope of the claimed invention.

What is claimed is:

1. A feedback apparatus in combination with a programmable machine controller for a multi-spindle machine having a plurality of spindles each producing a part thereon wherein the controller provides electrical output signals that control the position of at least one machine tool used to form machined parts on said spindles, said machine tool having a position, the feedback apparatus comprising:

a measuring device that provides an electrical output signal that is indicative of a characteristic of each machine part which characteristic is related to the position of the corresponding machine tool, a data analyzer for receiving said measuring device outputs and calculating an average value and range for said characteristic among a first subgroup of said part, said first group comprising a predetermined number of said parts made on each spindle of the machine, said data analyzer providing electrical output signal indicating average value and range of said characteristic of said parts in said first subgroup, and a programmable offset device that receives said output signals from said data analyzer and instructs the controller to offset the machine tool position responsive to said output signals from said data analyzer, whereby said average value and range are maintained within predetermined limits, said programmable offset device including a setup subroutine that is initiated when said range exceeds a predetermined limit or when said characteristic of any said parts is outside predetermined control limits, wherein said setup subroutine calculates an average value of said characteristic for a predetermined plurality of said parts from each spindle and instructs said machine controller to offset said corresponding machine tool position responsive to said average value calculated for each respective spindle.

2. A feedback apparatus according to claim 1 wherein offsets of said machine tool position are made for a plurality of subgroups of said parts during the machine's routine operating cycle.

3. A feedback apparatus according to claim 1 wherein the machine tool includes an electrically controlled slide servo that is positioned according to an electrical signal from the machine controller.

4. A feedback apparatus according to claim 3 wherein said programmable offset device compares said average value with a second predetermined set of control limits that are tighter than the specification tolerances for the machined parts, and calculates an offset value that when used to offset the corresponding machine tool position will cause the average value to trend toward nominal, said offset device instructing the machine controller to make such offset value changes to the corresponding machine tool position.

5. A feedback apparatus according to claim 4 wherein said offset device calculates said offset value according to the following formula:

$$\text{Offset Value} = \text{Nominal} - \frac{(\text{First Subgroup Avg.} + \text{a Second Subgroup Avg.})}{2}$$

wherein Nominal is the target dimension being machined and wherein said first subgroup consists of a single multiple of said plurality of parts and the second subgroup consists of the plurality of parts produced by said machine after said parts in said first subgroup.

6. A system for controlling the operation of a multi-spindle machine having a plurality of spindles each of which produces machined parts, said multi-spindle machine including a controller that controls movement of at least one tool used to form said machined parts on said spindles, said system comprising:

measuring means for measuring a characteristic of a machined part, said characteristic related to a position of the tool used to forms the part;

calculating means in operative connection with said measuring means for calculating an average value and a range of measurements for said characteristic in a first subgroup comprising a predetermined number of said parts made on each spindle of the machine;

offset means in operative connection with said calculating means and said controller, for comparing said average value and range for said characteristic in said first subgroup to first and second predetermined values respectively, and for delivering instructions to said controller based on said comparisons for positioning said tool; and setup subroutine means initiated when said range exceeds a predetermined limit or when said characteristic of any part is outside predetermined control limits, for calculating said plurality of second of said characteristic for a predetermined plurality of said parts from each spindle for instructing said controller to offset said corresponding tool position responsive to the second average value calculated for each respective spindle.

* * * * *

UNITED STATES PATENT AND TRADEMARK OFFICE
CERTIFICATE OF CORRECTION

PATENT NO. : 5,339,249

DATED : August 16, 1994

INVENTOR(S) : Schaeffer

It is certified that error appears in the above-identified patent and that said Letters Patent is hereby corrected as shown below:

Column 8, line 39. "part" is changed to --parts--.

Column 8, line 42. "signal" is changed to --signals--.

Column 10, line 23. "second" is changed to --second average values--.

Signed and Sealed this

Eighteenth Day of October, 1994

Attest:

BRUCE LEHMAN

Attesting Officer

Commissioner of Patents and Trademarks